UNITED STATES PATENT OFFICE

MELVIN DE GROOTE, OF ST. LOUIS, AND ARTHUR F. WIRTEL, OF WEBSTER GROVES, MISSOURI, ASSIGNORS TO TRETOLITE COMPANY, OF WEBSTER GROVES, MISSOURI, A CORPORATION OF MISSOURI

FLOODING PROCESS FOR RECOVERING OIL FROM SAND BEDS

No Drawing.   Application filed December 14, 1931.   Serial No. 581,055.

This invention relates to the recovery of oil from subterranean oil sands and other oil-bearing strata, and has for its main object to provide a practicable, inexpensive process for recovering oil that is held by adsorption on subterranean oil sands, such, for example, as the sands of exhausted oil fields, or the sands of oil fields that have been tested and abandoned, because they did not contain a sufficient quantity of oil to make it commercially feasible to attempt to recover the oil by conventional oil-producing methods.

Briefly described, our process consists in introducing an aqueous treating solution containing an oleic acid sulphate body, as herein defined into a number of oil wells that have ceased to be productive, and permitting said treating solution to travel through the oil sands and rise through a predetermined opening, the treating solution operating to liberate the film or coating of oil on the particles of sand, and to flush the oil off the particles of sand and carry the oil upwardly to the surface of the ground.

Oil exists in oil sands in two different states, i. e., as "free oil", that is located in the voids between the particles of sand, and as "fixed oil", which is held by adsorption on the particles of sand, and which is commonly referred to as a film of oil that adheres to the particles of sand. Free oil can be recovered by the conventional methods of producing oil, such as draining the oil in conjunction with liquid or gaseous pressure, or creating an artificial fluid or gaseous pressure in the sand bed, so as to dislodge and expel the oil from the sand bed into the well, and then conduct the oil to the surface of the ground by any suitable means or method. Fixed oil, i. e., the coating or film of oil on the particles of sand, cannot be recovered by any of the conventional methods used to produce oil, because it is held as a film surrounding the grains of sand and cannot be dislodged from the sand grains either by fluid or gaseous pressure.

We have discovered that "fixed oil", i. e., oil that is held in the form of a film by adsorption on subterranean oil sands and other oil-bearing strata, can be recovered at a sufficiently low cost to make the operation commercially feasible, if the oil sand with its encasement of oil is washed with an aqueous treating solution that contains or comprises an oleic acid sulfate body. The expression "oleic acid sulfate" is herein used in the chemical sense to mean a chemical compound (not a mechanical mixture) which is an acid ester of sulfuric acid and derived from a fatty material. It is not a sulfonic acid or a fatty acid sulfonate. The same procedure that is used in the ordinary flooding process for reworking abandoned oil fields can be employed to bring the treating solution into contact with the sands, due to the fact that the treating solution is of such a nature or character that it will flush the film of oil off the particles of sand. The liberated oil, after passing through the sand bed, can be conducted to the surface of the ground or recovered by any suitable or conventional procedure used to produce oil.

We have found that oleic acid sulphates, substantially free from other unsulphated fatty material, either physically mixed or chemically combined, are particularly adapted for use as a treating agent in the flooding of oil sands. The dibasic fatty acid may be employed, although the objection thereto is that the material is not stable and decomposes. We prefer to use oleic acid sulphates in the form of stable salts in which either one or both of the acid hydrogens present are neutralized. These acid hydrogens may be neutralized by the same base or else they may be neutralized by different bases. For the purpose of neutralization, the carbonates, bicarbonates, oxides, or hydroxides of sodium, potassium, ammonium, calcium, or magnesium may be employed. The hydrogen of the sulphate radical may be neutralized by washing with a neutral salt such as sodium sulphate, potassium sulphate, ammonium sulphate, magnesium sulphate, or calcium chloride. For the sake of convenience, the ammonium salt, being so similar in character to sodium and potassium salts, is considered as an alkali metal salt.

The salts in which the hydrogen of the sulphate group is neutralized and the hydrogen of the carboxyl unneutralized, will hereafter be referred to as acid salts. The salts in which both acid hydrogens are neutralized, will be referred to as neutral salts.

The manufacture of fatty acid sulphates mixed with large amounts of other fatty materials is well known in the art of preparing textile oils, as indicated by the British Patent No. 17,655, of 1909. We have found that textile oils, and Turkey red oils derived from an oleic acid body, even though they contain 30 to 45% of oleic acid sulphates mixed with other unsulphated fatty bodies, are entirely unsuited for the purpose of sand flooding, and that they precipitate with the naturally-occurring calcium and magnesium salts present in the oil sands or brines. Our reagent consists of oleic acid sulphates in the form of acid or neutral salts in the substantial absence of other unsulphated fatty material. Water, of course, may be present, because these reagents are used as aqueous solutions. Small amounts of solvents, such as carbon tetrachloride or chloroform may be present, but it is absolutely necessary that the extraneous fatty material, either chemically combined or physically mixed, be almost nil.

The first step in the preparation of the reagent or treating agent contemplated by our process, is to treat suitable oils, such as red oil, olive oil, etc., with a sulphonating agent, such as sulphuric acid in the presence or absence of a solvent, such as carbon tetrachloride, and obtain a mixture relatively high in oleic acid ester of sulphuric acid. This mixture is washed once with water so as to remove the excess of uncombined sulphuric acid. After such separation, it is dissolved in water and extracted repeatedly with a suitable organic solvent, such as ethyl ether. This removes unsulphated fatty bodies, hydroxystearic acid, and the like. If unsulphated bodies, chemically combined, are present, saponification must precede extraction. After sufficient extractions the aqueous solution should contain oleic acid sulphate in the substantial absence of other fatty material. This sulphated fatty material may be washed or neutralized as indicated in the British Patent No. 17,655 (1909) with any suitable salt or base, but most preferably with ammonium, sodium, or potassium hydroxides. It is preferably neutralized so that it represents an approximately equal part of the acid salt and of the neutral salt. In other words, all the hydrogen of the sulphate radical is neutralized and half the hydrogen of the carboxyl radical. As previously explained, the hydrogen of the sulphate radical may be neutralized with one base, such as potassium, and the hydrogen of the carboxyl may be neutralized with another base, such as sodium. The reagent or treating agent may consist of a mixture.

The treating agent that we prefer to use in our process consists of oleic acid hydrogen sulphate in which all the hydrogen of the sulphate and half of the hydrogen of the carboxyl has been neutralized with caustic soda. We have found that a mixture of approximately equal parts of the acid salt and the neutral salt is much more effective than either one alone, and we particularly prefer to use such a mixture derived from the sulphation of oleic acid.

Such material may be used in any convenient strength, dissolved in any kind of water in which it will make a solution substantially free from precipitates. It has the desirable characteristic of being capable of dissolving in hard or salty water, or in hard salty water almost as readily as in soft or distilled water, and without precipitation.

Our idea contemplates the use of salts of oleic acid sulfates, as herein defined, in any condition or state. Said salts of oleic acid sulphates may be used alone, or may be used with other substances known to have similar powers, such, for example, as an alkylated aromatic sulphuric acid or salt, such as propylated naphthalene sulphonic acid and its salts, wood sulphite liquor, etc., provided that they do not precipitate with soluble calcium and magnesium salts.

One highly desirable characteristic of an aqueous treating solution containing salts of oleic acid sulphates, which permits it to be used both on Pennsylvania oils and on oils asphaltic in nature, is that the products of the reaction between the reagent and hard water are water-soluble, and therefore, there is no possibility of a precipitate being formed that will clog the oil sands and obstruct or impede the flow of the wash water and the oil liberated from the particles of sand by the action of the reagent of the treating solution.

The principal advantages of our process are that it will not clog the oil sands on which the process is employed; it will effect the recovery from abandoned sand beds of oil that contains appreciable quantities of asphaltic or similar material; and the process is inexpensive to practice or carry out, since salts of oleic acid sulphates are so highly efficient that only a small amount need be employed. Although it is well known that the aqueous solution of reagents employed in the flooding of oil sands must have a low surface tension, yet it is generally believed that materials which have a strong tendency to form emulsions are unsatisfactory. If an emulsion of either the water-in-oil type or the oil-in-water type is formed, the viscosity is greatly increased, and the movement of the flooding solution and oil already liberated is substantially stopped. Reagents of the kind contemplated by our process are peculiar, in that they possess strong emulsifying power. This is readily demonstrated by the ability of a two per cent aqueous solution of a reagent of the kind herein described to emulsify mineral oil, crude oil and like material. In view of this fact one would not expect the reagent to be suitable for use in a flooding process for recovering fixed oil from subterranean oil sands. However, actual application demonstrates that the reagents herein described are very useful for the purpose described, notwithstanding their powerful emulsifying property.

In practising our process, we prefer to use a ratio of about 1 barrel of treating agent on the anhydrous basis, to 1,000 barrels of flushing water, but in some instances a ratio of 1 to 20,000, or even 1 to 40,000, may be used. The amount of solution employed may be equal to the amount of recovered oil, or it may be many times greater. The water may be cold or preheated, if desired. The actual mechanical practice is well known and we prefer to use the same apparatus that has been used in the Pennsylvania oil fields to practise the flooding process, or any modifications or variations of such an apparatus.

Having thus described our invention, what we claim as new and desire to secure by Letters Patent is:

1. A flooding process for recovering fixed oil from subterranean oil sands and other oil-bearing strata, which consists in washing the sand or stratum with an aqueous treating solution containing salts of oleic acid sulphates.

2. A flooding process for recovering fixed oil from subterranean oil sands and other oil-bearing strata, which consists in washing the sand or stratum with an aqueous treating solution containing the alkali metal salts of oleic acid hydrogen sulphate.

3. A flooding process for recovering fixed oil from subterranean oil sands and other oil-bearing strata, which consists in washing the sand or stratum with an aqueous treating solution containing a mixture of the alkali metal acid and alkali metal neutral salts derived from oleic acid hydrogen sulphate.

4. A flooding process for recovering fixed oil from subterranean oil sands and other oil-bearing strata, which consists in washing the sand or stratum with an aqueous treating solution comprising a mixture containing substantially equal amounts of the alkali metal acid and alkali metal neutral salts derived from oleic acid hydrogen sulphate.

5. A flooding process for recovering fixed oil from subterranean oil sands and other oil-bearing strata, which consists in washing the sand or stratum with an aqueous treating solution comprising a mixture of substantially equal amounts of sodium acid salt and the neutral sodium salt derived from oleic acid hydrogen sulphate.

MELVIN DE GROOTE.
ARTHUR F. WIRTEL.